A. E. BINNS.
SHOWER PIPE FOR PAPER MAKING MACHINES.
APPLICATION FILED AUG. 18, 1915.
1,163,734.
Patented Dec. 14, 1915.
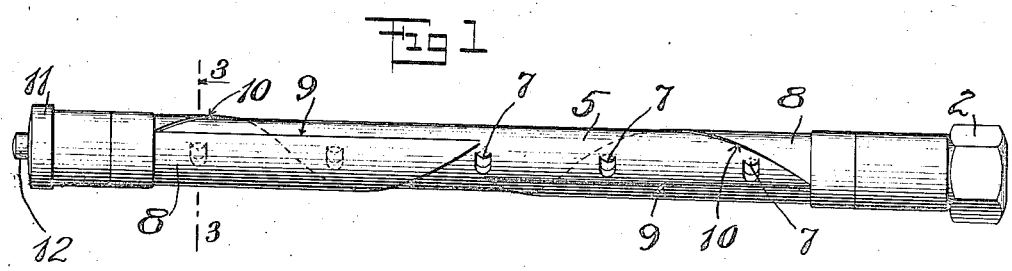
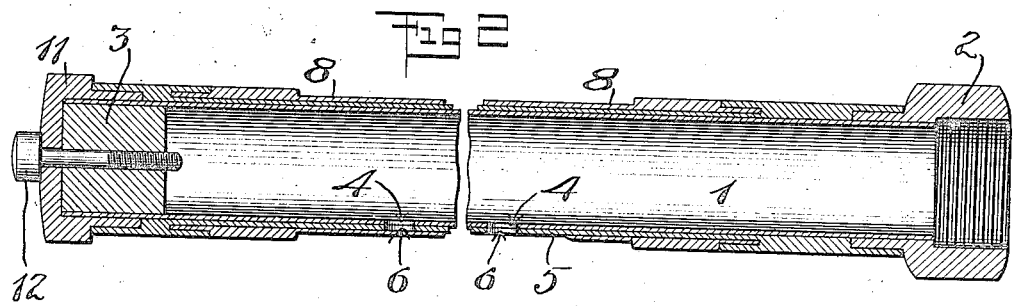
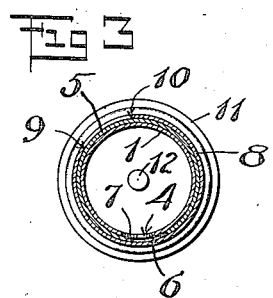
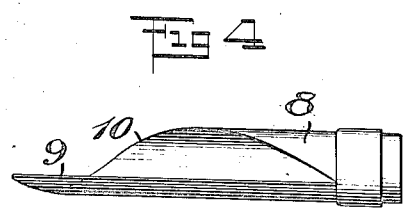
Witness
C. J. Hachenberg
Inventor
Arthur E. Binns
By his Attorneys

UNITED STATES PATENT OFFICE.

ARTHUR E. BINNS, OF NORWICH, CONNECTICUT.

SHOWER-PIPE FOR PAPER-MAKING MACHINES.

1,163,734.	Specification of Letters Patent.	Patented Dec. 14, 1915.

Application filed August 18, 1915. Serial No. 46,044.

*To all whom it may concern:*

Be it known that I, ARTHUR E. BINNS, a citizen of the United States of America, residing at Norwich, Connecticut, have invented a new and useful Shower-Pipe for Paper-Making Machines, &c., of which the following is a specification.

My invention relates to a new and improved shower pipe for paper making machinery and the like, the object being to provide a simple and effective construction capable of adjustment to vary the intensity and shape of the spray, and also to permit of the ready cleansing of the pipe itself. These and other advantages will be apparent to a mechanic skilled in this art, from a reading of the following description, and an examination of the accompanying drawings, in which—

Figure 1 is a side elevation of the pipe on a reduced scale. Fig. 2 is a relatively enlarged central longitudinal section broken away at the center. Fig. 3 is a cross section on the line 3—3. Fig. 4 is a view of a detached detail.

1 is a pipe of suitable length for the particular use intended, said central pipe 1 constituting the back bone or main support for the surrounding elements mounted thereon. This main pipe 1 is open at one end, for example, the end 2, to receive a supply of water. The other end is preferably closed, for example, by a suitable plug 3. At intervals throughout the length of the pipe 1 are round holes or outlets 4—4 arranged substantially in line and through which the water supply is forced. Snugly mounted upon the pipe 1 is an outside pipe 5 which is designed to operate as a valve for the discharge ports 4—4. This pipe 5, while snugly mounted on the pipe 1, may be shifted thereon for the purpose hereinafter described. The valve pipe 5 is provided with a series of ports or outlets 6—6 which are arranged to register with the outlets 4—4. These outlet openings in the valve pipe 5 are peculiarly shaped, one end of each opening being rounded by preference, to correspond substantially to the curve of its coöperating opening 4 in the main pipe 1. The other end of each of the openings 6 is provided with an inwardly projecting lip 7, the edge of which is formed on a curve, so that when this lip 7 projects over the opening 4, the actual clear passage will be crescent shaped, as best seen in Fig. 1. The width of this crescent shaped opening may be varied by turning the valve pipe 5 on the main pipe 1 to the desired degree. Any suitable means may be provided to cause the pipe 5 to remain in the desired position of adjustment on the pipe 1. For example, the fit between these pipes may be sufficiently snug to provide sufficient friction to hold the pipes in their relative adjusted position, this frictional holding of one pipe on the other being preferable because it not only avoids the use of separate instrumentalities, but it also guards against leakage. While the shape of the openings may be somewhat modified, the best results may be obtained by following closely substantially the form shown and described. By this arrangement I am enabled to get a uniform and effective spray and to avoid waste, each spray or stream being of fish-tail shape. The spacing between the various outlet ports may be varied at will, being, of course, proper that the spacing should be such that the several fish-tail streams shall just meet or slightly overlap so as to make a continuous sheet of water extending throughout the desired length. In the drawings I have shown the pipe as comparatively short, that is to say, ordinarily in paper making machines the length of the pipe must be sufficient to extend the full width of the machine, whereas lack of space has prompted me to illustrate the spray pipe of a length shorter than would ordinarily be used in practice. I have not attempted to show the supports for the ends of the pipe, since any suitable support may be employed.

Since in paper making machines it is customary to provide means for making sheets of different widths it is obviously necessary, in order to avoid waste, to provide means for varying the width of the spray. To that end, I provide a further improvement which enables me to very readily and effectively close one or more of the discharge openings for the above purpose. This means comprises a sleeve 8 which is slitted longitudinally to provide a substantially square edge 9, and a spiral edge 10. One of these sleeves may be provided on each end of the pipe as shown in the drawings, so that by turning one or both of the sleeves 8—8, one or more of the outlets may be closed off. In the particular adjustment shown in Fig. 1 the two outlets at the left hand end of the pipe, are shown as closed, while the three outlets to the right thereof are shown as open. The sleeves 8—8 may be mounted friction tight on the valve sleeve 5 whereby the said sleeves 8 will remain in any desired position of adjustment. For the purposes of assembling, one end of the pipe may have a removable flange 11 held in place by any suitable means such as the thumb screw 12 which screws into the plug 3. By removing the screw 12 and flange 11 the valve pipe 5 and the sleeves 8—8, which I will term the deckle in sleeves, may be readily removed. In actual practice, should the interior of the main pipe 1 become so clogged or filled with foreign matter, as is sometimes the case when the water is muddy, the said foreign material may be readily run out by opening the discharge ports 4—4 to their full capacity, the area of which is such that the pipe will then readily wash out.

It should be understood that I have shown and described my invention in its preferred form, and that I am fully aware that changes and modifications may be made without departing from the spirit and scope thereof.

What I claim is:

1. In a shower pipe, a main supply tube having a plurality of outlet ports arranged therein, a valve tube movably mounted thereon and having a series of coöperating discharge passages formed therein, whereby the relative movement of one pipe on the other may vary the cross sectional area of the actual discharge passages.

2. In a shower pipe, a main supply tube having a plurality of outlet ports arranged therein, a valve tube rotatably mounted thereon and having a series of discharge passages coöperating with said outlet ports whereby the rotation of one tube relatively to the other will vary the cross sectional area of the actual discharge passages.

3. In a shower pipe, a main supply tube having a plurality of outlet ports arranged substantially in line therewith, a valve tube carried thereby and movable relatively thereto, and a series of discharge ports in said valve tube arranged to coöperate with the ports in the main tube, whereby the movement of one tube relatively to the other will vary the size of the actual discharge passages.

4. In a shower pipe, a main supply tube having a plurality of outlet ports, a valve tube having a series of coöperating ports, said valve tubes being carried by the main tube and being adjustable thereon, and means also carried by said main tube for completely closing certain of the discharge passages at will.

5. In a shower pipe, a main supply tube having a plurality of outlet ports arranged therein, a valve tube having a series of coöperating discharge passages, means for adjusting said tubes relatively to each other to vary the area of the actual discharge passage, and means at the edge of one of said ports to produce a stream of substantially fish-tail shape.

6. In a shower pipe, a main supply tube having a plurality of outlet ports therein, a valve tube having a series of coöperating outlet ports, the edges of said ports respectively being shaped to produce substantially a crescent shape opening with the major axis extending substantially in the line of the pipe.

ARTHUR E. BINNS.